United States Patent [19]

Bigo

[11] Patent Number: 4,844,504
[45] Date of Patent: Jul. 4, 1989

[54] FOLDING PUSH-CHAIR FOR A CHILD
[75] Inventor: Jean Bigo, Cholet, France
[73] Assignee: Ampafrance S.A., Boulogne-Billancourt, France
[21] Appl. No.: 125,817
[22] Filed: Nov. 23, 1987

Related U.S. Application Data

[63] Continuation of Ser. No. 746,089, Jun. 18, 1985, abandoned.

[30] Foreign Application Priority Data

Jun. 22, 1984 [FR] France .................. 84 09814

[51] Int. Cl.⁴ .................................. B62B 7/08
[52] U.S. Cl. .......................... 280/642; 280/647; 280/650; 280/658
[58] Field of Search ............... 280/642, 658, 647, 650, 280/644, 42; 297/46, 55

[56] References Cited

U.S. PATENT DOCUMENTS

| | | | |
|---|---|---|---|
| 4,386,790 | 6/1983 | Kassai | 280/650 |
| 4,412,688 | 11/1983 | Giordani | 280/658 |
| 4,412,689 | 11/1983 | Lee | 280/648 |
| 4,428,598 | 1/1984 | Kassai | 280/644 |
| 4,449,732 | 5/1984 | Surot | 280/644 |

FOREIGN PATENT DOCUMENTS

| | | | |
|---|---|---|---|
| 2477491 | 9/1981 | France | 280/650 |
| 2510060 | 1/1983 | France | 280/644 |
| 2033309 | 5/1980 | United Kingdom | 280/648 |
| 2120609 | 12/1983 | United Kingdom | 280/644 |

Primary Examiner—Charles A. Marmor
Assistant Examiner—Eric Culbreth
Attorney, Agent, or Firm—Sandler & Greenblum

[57] ABSTRACT

A folding push-chair comprises two side chassis assemblies 6, each including a main support arm 8 linked to a front strut 9 and a rear strut 10. Each main support arm 8 lies parallel to the front strut 9 and cooperates therewith in a sliding manner, between an outward position when the push-chair is opened-out and a retracted position when collapsed, the rear strut 10 being coupled to the main support arm 8 and to the front strut 9 so that, during the relative sliding movement, the rear strut moves between a collapsed position in which it is closed against the main support arm and the front strut, and an opened-out position, in which it is in an active position, able to support the push-chair.

21 Claims, 2 Drawing Sheets

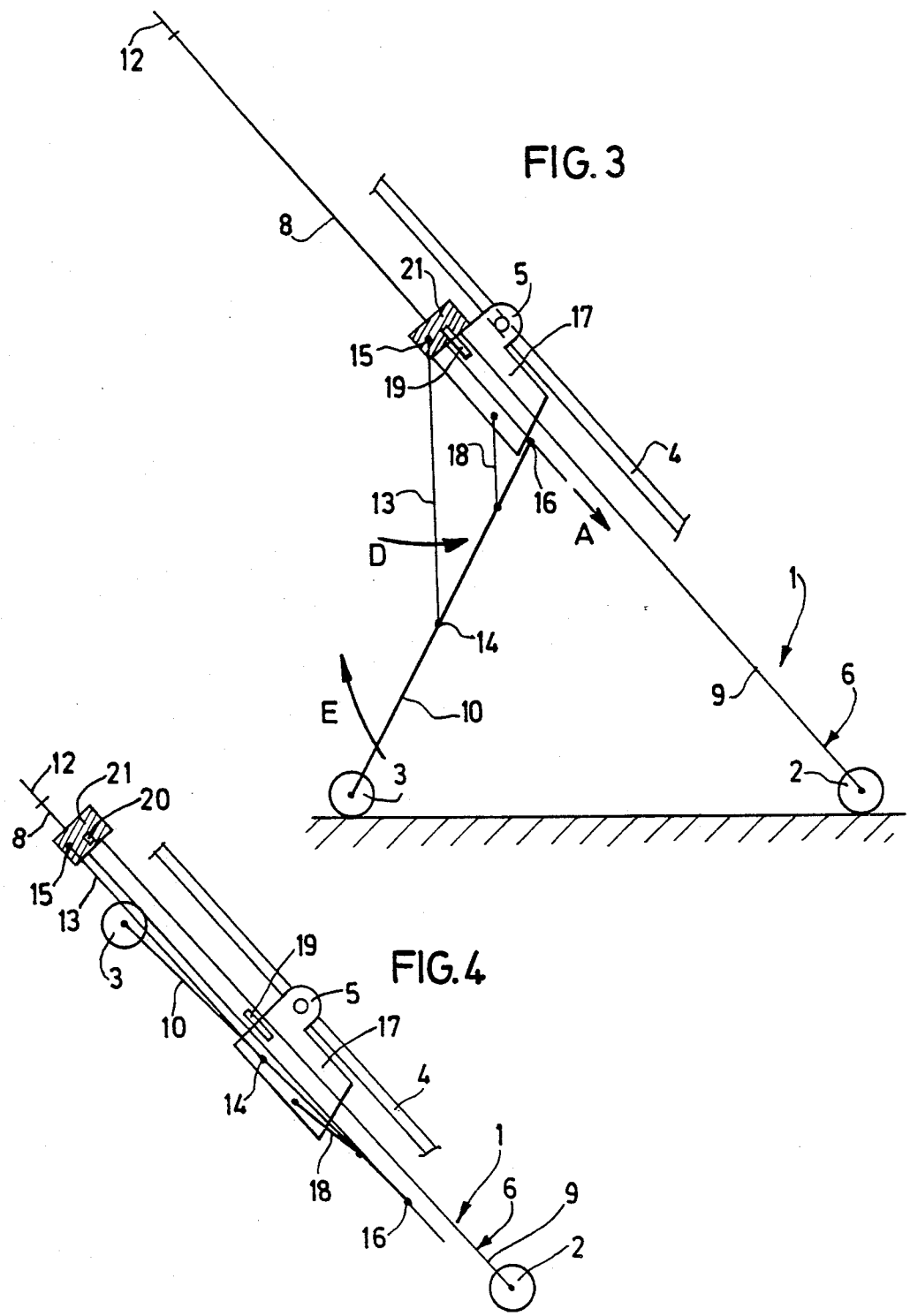

FOLDING PUSH-CHAIR FOR A CHILD

This application is a continuation, of application Ser. No. 746,089, filed June 18, 1985 now abandoned.

The invention relates to a collapsible push-chair for a child.

A collapsible foldable push-chair comprises, in a known manner, a support chassis for a carrier which in general may have adjustable inclination and be reversible. The chassis may comprise two side assemblies which are linked transversely by at least one transverse strutting member.

To collapse or fold the push-chair, each side assembly of the chassis can fold on itself and, in the case of a so-called 'walking-stick' push-chair can fold up together to form a 'bundle' of sticks, the strutting member being deformable so that the two side assemblies, during folding, can be brought together at the same time as they are folded on themselves.

The invention finds particular application with a folding push-chair of this type, and a principal object is to provide a push-chair of this type having a novel structure which is of easy use and is less cumbersome when in its collapsed state.

Accordingly, a collapsible push-chair of this invention comprises two side chassis assemblies and at least one transverse strutting member connecting the two side chassis assemblies, each side chassis assembly being deformable for collapsing and opening out of the push-chair and each side chassis assembly comprising a main support arm linked to a front strut and a rear strut, the main support arm being parallel to the front strut and co-operating in a sliding manner therewith between an outward position where the push-chair is opened out and a retracted position where the push-chair is collapsed, the rear strut being coupled to the main support arm and to the front strut by a pivot and by a controlling connecting rod, so that, during their sliding movements, the rear strut moves between a collapsed position in which it is closed against the main support arm and the front strut, and an opened out position in which the rear strut is in an active position, the connecting rod or the rear strut being coupled by a further connecting rod to a sleeve supporting a carrier able to slide in relation to the main support arm and the front strut, the sleeve being located between the extremities of the main support arm for all positions of the push-chair and having its location controlled, particularly for the collapsed state of the push-chair, by said further connecting rod.

According to an optional feature, the rear strut comprises a column pivoted on one of the main support arm and the front strut, the connecting rod which drives and maintains the position of the rear strut being pivoted to the column and to the other of the main support arm and front strut.

For example, the column may be pivoted, at its upper extremity, to the upper extremity of the front strut, the connecting rod then being pivoted, at one extremity, part-way but preferably mid-way up the column and at its other extremity, to the lower extremity of the main support arm. The connecting rod will then extend in front of the rear strut. In this construction, the front and rear struts, during folding, are closed one against the other thereby bringing close together their extremities carrying the wheels.

According the another example, the column is pivoted, at its upper extremity, to the lower extremity of the main support arm and the connecting rod is pivoted, at one extremity, part-way but preferably mid-way up the column and at its other extremity to the upper extremity of the front strut. The connecting rod will then extend to the rear of the rear strut. In this construction, the front and rear struts, during folding, close one against the other with an increase of the distance between their extremities carrying the wheels.

In the case of a push-chair which is also collapsible transversely to form a 'bundle' of sticks, the transverse strutting member may comprise a lattice or "X", or another system of folding such as rigid links, double hinges or the like, articulated on each side of the push-chair, to the rear strut and, depending upon the case, to the lower extremity of the main support arm or the front strut.

The co-operation of sliding between the main support arm and the front strut is preferably assured by providing at least one slider.

The push-chair may include a carrier which is mounted on a sleeve able to slide freely on the main support arm and on the front strut. Advantageously, this sleeve, located between the lower extremity of the main support arm and the upper extremity of the front strut, constitutes a stop means for the opened-out position of the push-chair and is linked to the rear strut so that that latter, during the folding of the chassis, controls the position of the sleeve and the carrier.

The push-chair may also have locking means to prevent unintentional collapse from the opened-out position. For example, such locking means, may be of the automatic 'click' type, arranged preferably on each side, to prevent sliding of the main support arm and the front strut.

By way of example only, two specific embodiments of this invention will now be described in detail, referring to the accompanying drawings, in which:

FIGS. 3 and 4 are views similar to FIGS. 1 and 2, respectively, for a second embodiment.

Figure 1:
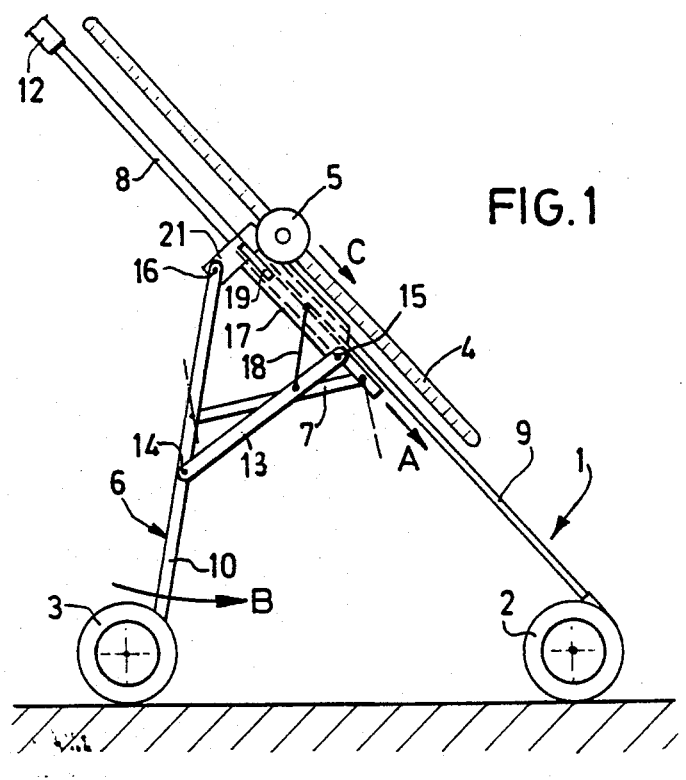
FIG. 1 is a side view of a first embodiment of folding push-chair according to the invention, in the opened-out state.

The following description is made, by way of example, of the preferred application of the invention to a folding push-chair of the type which collapses to have the main elements lying alongside one another like a 'bundle' of sticks.

First of all, the elements common to the two push-chairs of FIGS. 1 to 4 will be described.

The push-chair comprises a chassis 1 which is mounted on single or double front wheels 2 and rear wheels 3, and which supports a carrier 4 or the like to receive a child, by means of two clamps 5 enabling the angular position of the carrier to be adjusted and locked.

The chassis 1 comprises two side chassis assemblies 6, similar and preferably identical, linked by at least one transverse strutting member 7 constituted by a lattice or "X", or rigid cross, double hinges, and so on. The two assemblies 6 here are identical and symmetrical in relation to the vertical longitudinal median plane of the push-chair, and a description will be given for one assembly only.

Each assembly 6, generally made of metallic tubing or a plastic material, includes three essential elements: a main support arm 8, a front strut 9 and a rear strut 10.

The main support arm 8 is equipped, at its rear upper extremity, with a handle 12 or the like. At their free lower extremity, the front struts 9 and rear struts 10 carry wheels 2 and 3 respectively.

Figure 2:
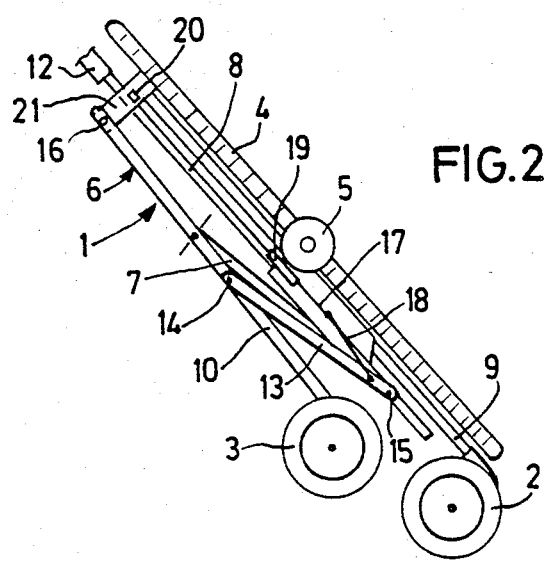
FIG. 2 is a view similar to FIG. 1, but for the collapsed state of the push-chair.

In this embodiment, the main support arm 8 is parallel to the front strut 9 and co-operates with the latter in a sliding manner between an outward position when the push-chair is opened out (FIGS. 1 and 3) and a retracted position where the push-chair is collapsed (FIGS. 2 and 4). The rear strut 10 is coupled to the main support arm 8 and to the front strut 9 so that, during the sliding movements of these, the rear strut 10 moves between an opened out position, in which it is in an active position, and a collapsed position, in which it is closed against the main support arm and the front strut.

The rear strut 10 is in the form of an oblique column, for example rectilinear, like the arm 8 and the front strut 9, this column co-operating with a connecting rod 13 which assures control of the movements and maintains the column in position.

At one extremity, the rod 13 is articulated on the column 10, about half-way up the latter, about a pin 14 with its axis transverse. The other extremity of the rod 13 and the upper extremity of the column 10 are articulated about pins 15 and 16, with transverse axes, on the lower and upper extremities of the arm 8 and the front strut 9, respectively or irrespectively.

The clamp 5 of the carrier support 4 is carried by a sleeve 17 transversed freely by the arms 8 and by the front strut and therefore acting as a means for guiding the sliding motion. The sleeve 17 is placed between the lower extremity of the arm 8 and the upper extremity of the front strut 9.

The position of the sleeve, at any moment, is defined by a short connecting rod 18 pivoted to the sleeve and to the rod 13 (FIGS. 1 and 2), or to the column 10 (FIGS. 3 and 4). The rod 18 is arranged so that, for the collapsed position (FIGS. 2 and 4), the clamp 5 is situated more of less at the centre of the total length of the collapsed push-chair.

In both embodiments, the sleeve 17 serves as a stop to limit the opening of the push-chair. This stop is advantageously supplemented by a locking means composed of, for example, a resilient catch 19 carried by the sleeve 17 and able to co-operate with a notch 20 in a slider 21 which is fixed at the upper extremity of the front strut and which takes part in the guiding of the sliding movement, by being freely traversed by the arm 8.

In the preferred construction shown in FIGS. 1 and 2, the column 10 is articulated at 16 on the slider 21 and the rod 13 is articulated at 15 on the lower extremity of the arm 8 and is situated forward of the column. During the collapsing or folding movement of the push-chair, starting from the position of FIG. 1 and taking the front strut 9 as a reference, the arm 8 is driven axially in the direction of arrow A, drawing with it the pivot 15 in the same movement; the column 10 swings towards the front in the direction of arrow B around the fixed pivot 16, by being drawn by the rod 13; during this movement, the short rod 18, driven by the rod 13, draws the sleeve 17 downwardly, carrying the carrier 4. At the end of the travel, the arm 8 is practically completely retracted, the column 10 and the rod 13 are closed against the arm 8 and the front strut 9, the wheels 2, 3 are next to each other, and the carrier 4 is more or less centred.

Collapsing can be effected, after unlocking the two catches 19, by a simple axial pressure on the arms 8, the reduction ratio provided by the rod 13 enabling the user to dispense with also having directly to urge the rear struts 10.

To open out the push-chair, it is sufficient for the user to pull the arms 8 sharply towards himself, to cause, by inertia, the unfolding until the sleeves 17 come to a stop simultaneously against the sliders 21 and the rods 13. The locking is done automatically by the catches 19.

In this construction, the lattice 7 is articulated at its extremities, about axes perpendicular to the general plane of the lattice, on the columns 10 and on the lower emtremity of the arm 8.

In the construction of FIGS. 3 and 4, the column 10 is articulated at 16 on the lower extremity of the arm 8 and the rod 13 is articulated at 15 on the slider 21 and is situated behind the column. During the folding movement of the push-chair, starting from the position of FIG. 3 and taking the front strut as a reference, the arm 8 is driven in axially in the direction of the arrow A, drawing with it in the same movement the pivot 16; the column 10, which is held at its intermediate pivot 14 by the rod 13 pivoting about the fixed pivot 15 in the direction of arrow D, turns towards the rear in the direction of arrow E; during this movement, the short rod 18, driven by the column 10, draws the sleeve 17 carrying the carrier 4 downwardly, At the end of the folding motion, the arm 8 is practically completely retracted, the column 10 and the rod 13 are closed against the arm 8 and the front strut 9, the wheels 2, 3 are opposed, and the carrier 4 is more or less centred.

The control of the collapsing and opening out is made in a manner similar to that which has been described with reference to FIGS. 1 and 2.

In the example of construction of FIGS. 3 and 4, the lattice 7 is articulated, at its extremities, about axes perpendicular to its general plane, at 16 on the column 10 and at an intermediate point 22 on the rod 13.

It follows from the foregoing that a push-chair according to the invention is of a very simple construction, since it is sufficient to pull or push axially the main support arms 8 to cause the collapsing or folding and the opening out thereof.

I claim:

1. A collapsible stroller for a child, said stroller comprising first and second side chassis assemblies and at least one transverse strut connecting said first side chassis assembly to said second side chassis assembly, each of said side chassis assemblies comprising a main support arm, a front strut, and a rear strut, each of said assemblies being foldable to collapse and open said stroller, wherein said main support arm is substantially parallel to said front strut and is slidably positioned within a sleeve with respect to said front strut, said main support arm being slidable between an extended position in which said stroller is open and a retracted position in which said stroller is collapsed, each of said rear struts having one end which is pivotably coupled to a respective main support arm via a slider through which said main support arm is adapted to slide, each rear strut being further connected to a respective main support arm by a first connecting rod which is pivotably connected to said rear strut and to said main support arm, respectively, so that when said support arm and said front strut slide with respect to each other, said rear strut will move between a collapsed position in which it is closed toward said main support arm and said front strut and an open position in which said rear strut is in an extended position, said first connecting rod being coupled by an additional connecting rod to said sleeve, wherein both said sleeve and a carrier attached to said chassis assemblies are capable of sliding with respect to said main support arm and said front strut, said sleeve being positioned between first and second ends of said main support arm in all positions of said stroller, said additional connecting rod comprising means for controlling the position of said sleeve, said first connecting rod being pivotably attached to said main support arm at a point different from the point at which said rear strut is pivotably attached to said slider.

2. A stroller in accordance with claim 1, wherein one end of each of said front struts and each of said rear struts comprises means for carrying a wheel for said stroller, said wheel carrying ends of said front and rear struts being located substantially adjacent to each other when said stroller is collapsed.

3. A stroller in accordance with claim 1, wherein said sleeve comprises means for guiding said main support arm and said front strut during sliding motion of said main support arm and said front strut, said main support arm and said front strut being slidably positioned within said sleeve.

4. A stroller in accordance with claim 1, wherein said sleeve comprises a stop for limiting sliding movement of said stroller into an open position.

5. A stroller in accordance with claim 4, further comprising means for locking said stroller in said open position, said locking means operating automatically to engage a corresponding notch on said slider at the end of sliding movement of said stroller.

6. A collapsible stroller for a child, said stroller comprising first and second said chassis assemblies and at least one transverse strut connecting said first saide chassis assembly to said second side chassis assembly, each of said side chassis assemblies comprising a main support arm, a front strut, and a rear strut, each of said assemblies being foldable to collapse and open said stroller, wherein said main support arm is substantially parallel to said front strut and is slidably positioned in a sleeve with repect to said front strut, said main support arm being slidable between an extended position in which said stroller is open and a retracted positon in which said stroller is collapsed, each of said rear struts being pivotably coupled to a respective main support arm via a slider within which said main support arm slides, each of said rear struts being further connected to a respective main support arm by a first connecting rod which is pivotably connected to said rear strut and to said main support arm, respectively, wherein when said support arm and said front strut slide with respect to each other, said rear strut will move between a collapsed position in which it is closed towards said main support arm and said front strut and an open position in which said rear strut is in an extended position, said first connecting rod being coupled by an additional connecting rod to said sleeve, wherein both said sleeve and a carrier attached to said chassis assemblies are capable of sliding with respect to said main support arm and said front strut, said sleeve being positioned between first and second ends of said main support arm in all positions of said stroller, said additional connecting rod comprising means for controlling the position of said sleeve, said first connecting rod having a first end being pivotably attached to said main support arm at a point differnt from the point at which said rear strut is pivotably attached to said slider, said first connecting rod being pivoted at a second end between first and second ends of said rear strut, and at said first end to a lower end of said main support arm, said additioal connecting rod being pivotably attached at one end to said first connecting rod.

7. A stroller in accordance with claim 6, wherein said first connecting rod extends forwardly of said rear strut.

8. A collapsible stroller for a child, said stroller comprising first and second foldable side chassis assemblies and at least one transverse strut connecting said first side chassis assembly to said second side chassis assembly, each of said side chassis assemblies comprising a main support arm which is attached to a front strut and to a rear strut, said main support arm being substantially parallel to said front strut and being sldidably positioned with respect to said front strut, between an extended position in which stroller is open and a retracted position in which said stroller is collapsed, each of said rear struts having an upper end and a lower end, each rear strut being pivotably connected at said upper end to one of said main support arm and front strut, said rear strut being further connected to the other of said main support arm and front strut be a first connecting rod, pivotably connected at a lower end of said first connecting rod to said rear strut and at an upper end of said first connecting rod to said other of said main support arm and front strut, wherein when said support arm and said front strut slide with respect to each other, said rear strut moves between a collapsed position in which it is closed towards said main support arm and said front strut and an open position in which said rear strut is in an operably, extended position, each of said side chassis assemblies further comprising a sleeve, said stroller further comprising a carrier attached to said sleeves, said carrier and said sleeves being longitudinally slidable with respect to said main support arm and said front strut, said sleeve being positioned between an upper end of said front strut and a lower end of said main support arm, said sleeve comprising means for slidably receiving said main support arm and said front strut in all positions of said stroller.

9. A stroller in accordance with claim 8, wherein said sleeve is movable between a first position in which said stroller is opened and a second position in which said stroller is collapsed.

10. A stroller in accordance with claim 8, wherein said sleeve is movable between first and second abutment positions, wherein said first abutment position is an upper abutment position in which said sleeve abuts a slider which is attached to an upper end of said front strut.

11. A stroller in accordance with claim 8, further comprising means for locking said stroller in said open position, said locking means comprising means for locking said stroller automatically at the end of movement of said stroller into said open position.

12. A stroller in accordance with claim 8, wherein said sleeve includes a stop for terminating sliding movement of said sleeve.

13. A stroller in accordance with claim 8, wherein a slider is secured to an upper end of said front strut, said slider slidably receiving said main support arm.

14. A stroller in accordance with calim 8, further comprising means for connecting each said sleeve to a respective side chassis assembly, each of said sleeves being slidably movable when said stroller is moved between said open and said collapsed positions.

15. A stroller in accordance with claim 14, wherein said connecting means comprises an additional connecting rod which has an upper end end which is pivotably connected to said sleeve and a lower end which is pivotably attached to one of said rear strut and first connecting rod.

16. A stroller in accordance with claim 15, wherein said rear strut is pivotably attached at its upper end to an upper end of said front strut, said first connecting rod having its upper end pivotably attached to a lower end of said main support arm, said additional connecting rod being pivotably attached at its lower end to said first connecting rod.

17. A stroller in accordance with claim 16, wherein said first connecting rod extends forwardly of said rear strut.

18. A stroller in accordance with claim 16, wherein each of said front and rear struts has a free lower end, each of said strut lower ends comprising means for carrying a wheel of said stroller, said wheel-carrying lower ends being located substantially adjacent to each other when said stroller is collapsed.

19. A stroller in accordance with claim 15, wherein said rear strut is pivotably attached at its upper end to a lower end of said main support arm, said first connecting rod having its upper end pivotally attached to an upper end of said front strut, said additional connecting rod being pivotally attached at its lower end to said rear strut.

20. A stroller in accordance with claim 19, wherein said first connecting rod extends away from said rear strut.

21. A stroller in accordance with claim 20, wherein the lower ends of each of said front and rear struts comprise means for carrying stroller wheels, said wheel-carrying lower ends being positioned substantially remotely from each other when said stroller is moved into said collapsed position.

* * * * *